United States Patent [19]

Lundstrom

[11] 4,408,334
[45] Oct. 4, 1983

[54] WAVEPLATE FOR CORRECTING THERMALLY INDUCED STRESS BIREFRINGENCE IN SOLID STATE LASERS

[75] Inventor: Eric A. Lundstrom, Ridgecrest, Calif.

[73] Assignee: The United States of America as represented by the Secretary of the Navy, Washington, D.C.

[21] Appl. No.: 243,416

[22] Filed: Mar. 13, 1981

[51] Int. Cl.$^3$ .............................................. H01S 3/08
[52] U.S. Cl. .................................... 372/98; 372/105; 372/21; 372/33; 372/93
[58] Field of Search ................... 372/105, 106, 33, 12, 372/100, 94, 27, 98

[56] References Cited

U.S. PATENT DOCUMENTS

| | | | |
|---|---|---|---|
| 3,327,243 | 6/1967 | Stickley | 372/100 |
| 3,373,376 | 3/1968 | Clark et al. | 331/94.5 |
| 3,484,714 | 12/1969 | Koester et al. | 331/94.5 |
| 3,564,454 | 2/1971 | Hook et al. | 331/94.5 |
| 3,629,723 | 12/1971 | Snitzer | 372/23 |
| 3,662,281 | 5/1972 | Koechner | 331/94.5 |
| 3,702,974 | 11/1972 | Koechner et al. | 331/94.5 T |
| 3,924,201 | 12/1975 | Crow | 372/12 |
| 3,928,818 | 12/1975 | White | 331/94.5 T |
| 4,024,466 | 5/1977 | Cremosnik | 331/94.5 D |
| 4,292,602 | 9/1981 | Bergqvist | 372/94 |

FOREIGN PATENT DOCUMENTS 2037064 7/1980 United Kingdom .................. 372/33

OTHER PUBLICATIONS

"Matrix Method for Calculation of the Polarization Eigenstates of an Anisotropic Optical Resonator", Molchzinov et al., *Sov. Jour. of Quanl. Electron*, vol. 1, No. 4, Jan.-Feb. '72.
"Dual—Polarized Ring Lasers", Sanders et al., *IEEE Jour. of Quanl. Elect.*, vol. QE—13, No. 9, Sept. 1977.
"Polarization Properties of Corner Reflectors and Cavities", by Peck, *Journal of the Optical Society of America*, vol. 52, No. 3, Mar. 1962.

Primary Examiner—James W. Davie
Assistant Examiner—Léon Scott, Jr.
Attorney, Agent, or Firm—R. F. Beers; W. T. Skeer; K. G. Pritchard

[57] ABSTRACT

Thermally induced stress birefringence in laser resonators is eliminated by inserting a waveplate in the resonating cavity. The waveplate is chosen by matching its polarization transmission matrix to the polarization transmission matrices of the laser rod and a Porro prism used as an end reflector in the resonating cavity. This produces a total polarization transmission matrix in the resonating cavity which is independent of ray coordinates. Additional control of the polarization transmission matrix is provided using a Porro prism as a cavity reflector that has an antireflection coating on its roof to change the required phase advance angle of the waveplate.

7 Claims, 4 Drawing Figures

WAVEPLATE FOR CORRECTING THERMALLY INDUCED STRESS BIREFRINGENCE IN SOLID STATE LASERS

BACKGROUND OF THE INVENTION

1. Field of the Invention

This invention pertains to laser resonator systems. Specifically, the present invention is for a method and means for correcting thermally induced stress birefringence in laser resonators.

2. Description of the Prior Art

Birefringence or double refraction is the splitting of a beam of light into two components which travel at different velocities. This phenomena is normally induced as a consequence of thermal stress in solid state laser devices, such as laser crystals. A laser rod, such as a yttrium aluminum garnet crystal doped with neodymium ions, known as a Nd:YAG, must dissipate significant amounts of heat. The cylindrical geometry of such rods leads to a radial temperature gradient with the highest temperature at the center of the rod and the coolest temperature on the surface of the rod where cooling occurs. This temperature gradient generates thermal stresses causing compression within the rod and tension at the surface. Different geometries of rods merely give rise to different shaped thermal gradients.

Numerous patents have been awarded for techniques to correct birefringence. Some of these techniques provide limited compensation of the birefringence by introducing equal and opposite thermal stresses into the rod itself. Others have had various types of components inserted into the resonating cavity to rotate the plane of polarization or to mechanically apply equal and opposite stresses. In general, these devices have only had limited success. The limited success is because there are numerous factors creating the birefringence, while each component disclosed previously has been designed to deal with a specific factor in causing the birefringence.

SUMMARY OF THE INVENTION

The insertion of a waveplate into a laser resonator using Porro prisms is used to change the overall polarization transmission matrix for the resonating cavity to a value which is independent of ray coordinates. This is done by calculating the necessary matrix values for the waveplate as compared to the total polarization transmission matrices of specific optical components of the resonating cavity. Since all factors except for the waveplate are fixed in the creation of the resonating cavity, the specific matrix description of the waveplate can be defined and a waveplate produced with particular matrix elements. Additional control of the transmission matrix elements can be provided by selectively coating the reflectors in the resonating cavity.

DESCRIPTION OF THE PREFERRED EMBODIMENT

Figure 1:
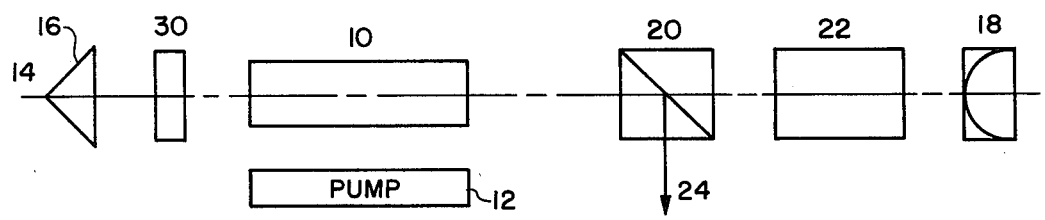
FIG. 1 is a block diagram of the present invention.

FIG. 1 is an optical schematic of a laser resonator used in the present invention. Such resonators are useful for military laser rangefinders and target designators. An active gain media 10, which can be Nd:YAG, is a laser rod which is subject to stress birefringence effects at high input power loading when flashlamp 12 is pumped. The laser resonator is formed by two Porro prisms which serve as end reflectors. The first Porro prism 14 changes the state of polarization of a reflected light ray to a degree which depends on the orientation of the prism roof edge 16 and the index of refraction, n, of the prism material. For simplicity, Porro prism 18 is assumed to be made of the same material. Porro prisms are often used because they impart a high degree of alignment stability to the resonator. The resonator is Q switched, pulsed, using a polarizer 20 and a Pockel cell 22 in combination as an output shutter. The output beam 24 of the laser is taken off of polarizer 20. The output coupling fraction of the resonator can be selected by proper choice of the prism index, n, and roof edge orientation. Stress birefringence within laser rod 10 changes the state of polarization depending on the transverse position of the ray. The output coupling fraction of the resonator will therefore depend on the transverse coordinates of the ray.

Waveplate 30 is added to the resonating cavity between active gain media 10 and Porro prism 14 to cancel the nonuniform change in polarization induced by thermally stressed laser rod 10. Cancellation takes place on the return pass of a ray through laser rod 10. Cancellation occurs due to the change in polarization transmission matrix.

The state of polarization of any ray is specified by an electric field vector with complex components on the orthogonal x and y directions $$E = \begin{pmatrix} E_x \\ E_y \end{pmatrix} \quad (1)$$

The x direction lies parallel to Porro prism 14 roof edge 16. The ray is presumed to travel in the z direction and the time variation of the field goes as $e^{i\omega t}$. Transmission of a ray through laser rod 10, waveplate 30 or Porro prism 14 is described by multiplying the electric field vector E by the product of 2×2 unitary matrices with complex components. Each element that the ray transmits through has this unitary matrix which is the polarization transmission matrix for that specific element. Each polarization transmission matrix describes an optical element transversal.

If laser rod 10 is a cylindrical rod, the heat loading is assumed to be radially symmetric and the cooling is uniform along any given radius. Then the polarization transmission matrix $M_R$ is given by $$M_R(r,\theta) = \begin{pmatrix} a_R & b_R \\ -b_R^* & a_R^* \end{pmatrix} \quad (2)$$

where the complex matrix elements are given by $$a_R = \cos\frac{\rho_R(r)}{2} + i\sin\frac{\rho_R(r)}{2}\cos2\theta \quad (3)$$

$$b_R = i \sin \frac{\rho_R(r)}{2} \sin 2\theta \quad (4)$$

Figure 2:
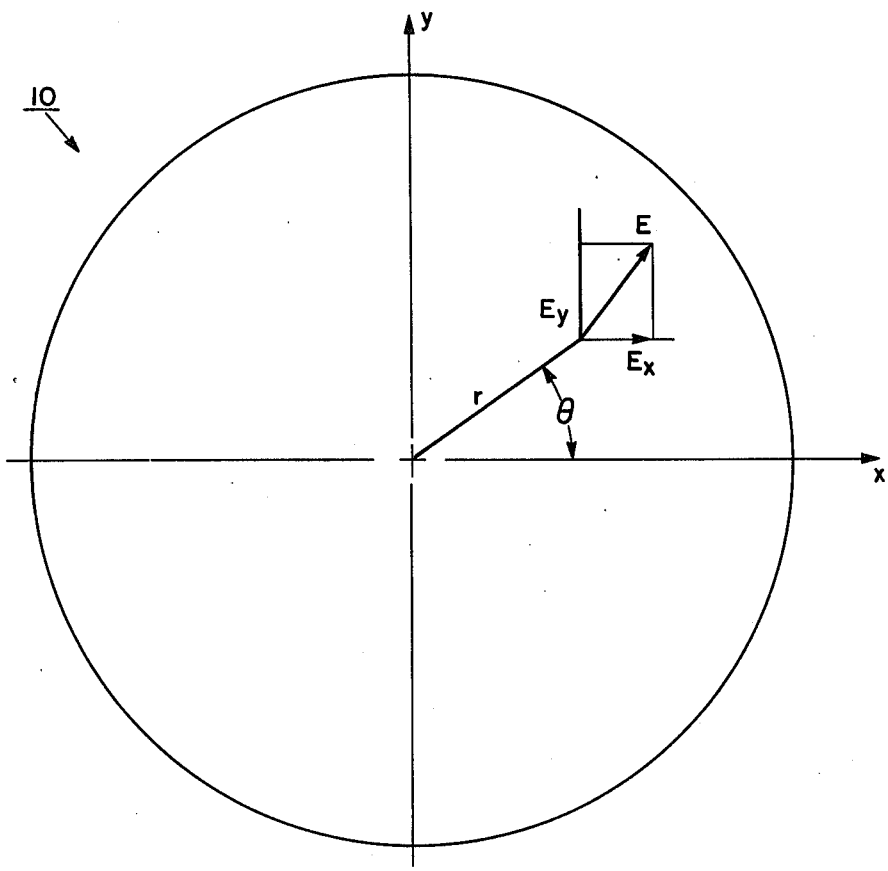
FIG. 2 is a coordinate system for a ray in transmission through a laser rod.

In the above equations, the angle $\theta$ is the azimuth coordinate of the ray with respect to the x axis as shown in FIG. 2. The phase advance angle $\rho_R(r)$ is a function of the radius coordinate r, of the ray within laser rod 10. The overall electric field geometry is shown in FIG. 2 which represents a cross section of laser rod 10. If laser rod 10 heat loading is uniform, then $\rho_R(r)$ is a quadratic function of r. The asterisks indicate complex conjugates. The phase advance angle is the shift in phase that the ray undergoes when it passes through laser rod 10. The phase advance angle is the difference in phase between light transmitted along the fast axis of an element and light transmitted along the slow axis of the same element. The terms fast and slow axis refer to the fact that the orientation of the polarization will change the speed of propogation within an optical element.

Polarization transmission matrix of waveplate 30 is given by $$M_w = \begin{pmatrix} a_w & b_w \\ -b_w^* & a_w^* \end{pmatrix} \quad (5)$$

where $$a_w = \cos \frac{\rho_w}{2} + i \sin \frac{\rho_w}{2} \cos 2\theta_w \quad (6)$$

$$b_w = i \sin \frac{\rho_w}{2} \sin 2\theta_w \quad (7)$$

The angle $\theta_w$ is the angle of the optical axis of waveplate 30 with respect to the x axis and $\rho_w$ is the phase advance angle. $\theta_w$ is the rotation angle between the Porro prism axis and the fast axis of the waveplate.

The matrix of Porro prism 14 with roof edge 16 aligned with the axis is $$M_P = \begin{pmatrix} e^{i\frac{\rho_P}{2}} & 0 \\ 0 & e^{-i\frac{\rho_P}{2}} \end{pmatrix} \quad (8)$$

where the angle $\rho_P$ is given by $$\rho_P = \pi - 4 \tan^{-1} \sqrt{1 - \frac{2}{n^2}} \quad (9)$$

n is the refractive index of Porro prism 14 at the operating wavelength of laser rod 10.

The total polarization transmission matrix, M, through laser rod 10, waveplate 30, Porro prism 14 and then back through waveplate 30 and laser rod 10 is given by $$M = M_R(r, -\theta) M_w M_P M_w M_R(r, \theta) \quad (10)$$

where the ray has radius r and angle $\theta$. The angle $-\theta$ is used on the return trip through laser rod 10 because Porro prism 14 produces a reflection about the x axis. The total polarization transmission matrix is the product of the consecutive elements that the ray must pass through.

By proper choice of $M_w$, it is possible to compensate for the birefringence in laser rod 10 and make M independent of the ray coordinates r and $\theta$. To do this, a matrix $M_c$ is defined as the product of $$M_c = M_w M_P M_w \quad (11)$$

the total polarization transmission matrix is $$M = M_R(r, -\theta) M_c M_R(r, \theta) \quad (12)$$

For compensation to occur, the matrix $M_c$ must be $$M_c = \begin{pmatrix} 0 & i \\ i & 0 \end{pmatrix} \quad (13)$$

Substitution of equations (13), (2), (3) and (4) into equation (12) and performing the indicated matrix multiplication, the total matrix M is $$M = \begin{pmatrix} 0 & i \\ i & 0 \end{pmatrix} \quad (14)$$

which is independent of ray coordinates and is equal to the compensation matrix $M_c$. Thus, the total polarization transmission matrix M now represents a condition where thermally induced stress birefringence is fully corrected. To compensate for birefringence, only Porro prism 14 and gain media 10 must be considered. Polarizer 20, Pockel cell 22 and Porro prism 18 do not affect the birefringence.

According to equations (11), (13) and (8), the matrix elements of a compensating waveplate $M_c$ must satisfy $$M_c = \begin{pmatrix} 0 & i \\ i & 0 \end{pmatrix} = M_w \begin{pmatrix} e^{i\frac{\rho_P}{2}} & 0 \\ 0 & e^{-i\frac{\rho_P}{2}} \end{pmatrix} M_w \quad (15)$$

Equation (15) is satisfied by $$M_w = \frac{1}{\sqrt{2}} \begin{pmatrix} e^{-i\frac{\rho_P}{2}} & i \\ i & e^{i\frac{\rho_P}{2}} \end{pmatrix} \quad (16)$$

which can be verified by substitution.

Comparing equation (16) with equations (5), (6) and (7) shows that the phase advance angle of waveplate 30 must be $$\rho_w = -2 \cos^{-1} \left( \frac{1}{\sqrt{2}} \cos \frac{\rho_P}{2} \right) \quad (17)$$

and the fast axis angle $\theta_w$ with respect to the x axis must be $$\theta_w = \tfrac{1}{2} \sin^{-1}\left(\frac{1}{\sqrt{2}\,\sin\frac{\rho_w}{2}}\right) \quad (18)$$

Figure 3:
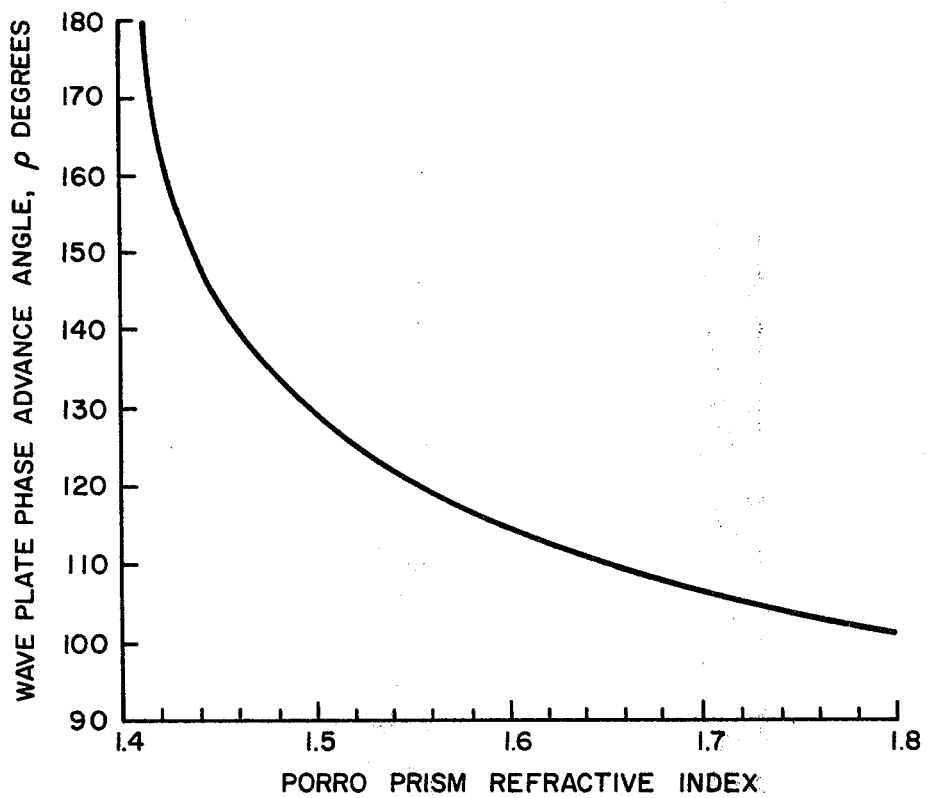
FIG. 3 is a graph of waveplate phase advance angle versus a Porro prism refractive index.

Porro prism 14 phase angle $\rho_p$ is given as a function of refractive index by equation (9). The compensating waveplate phase angle is plotted in FIG. 3 as a function of Porro prism refractive index n. As shown it varies from 180° to 90°.

Figure 4:
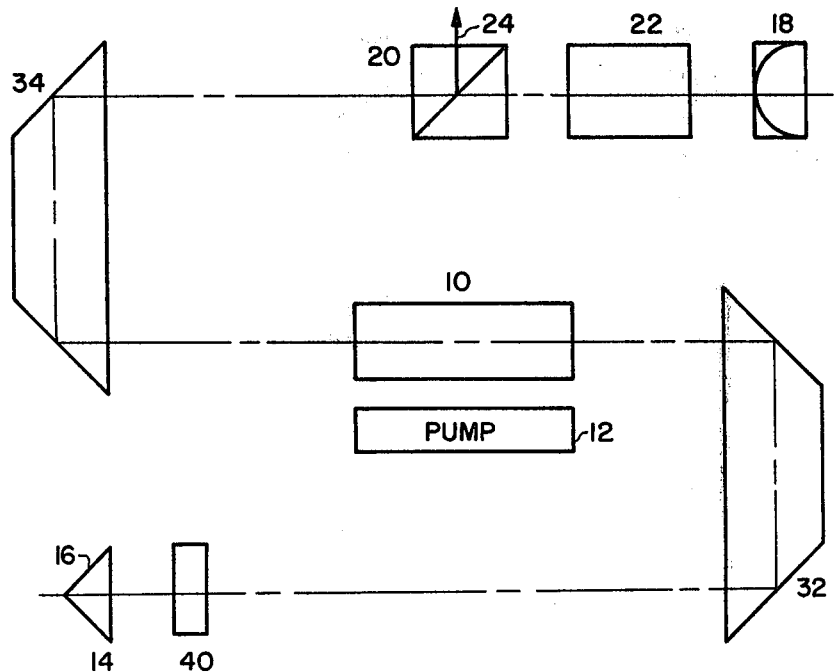
FIG. 4 is a block diagram of the present invention for a folded laser resonator.

In order to conserve space, laser resonators are often folded using totally reflecting prisms or cube corners. FIG. 4 is an optical diagram similar to FIG. 1 except for the addition of two totally reflecting prisms 32 and 34. Remaining numerals in FIG. 4 represent similar components to those shown in FIG. 1. The reflections taking place within total reflecting prism 32 changes the polarization of the reflecting light. Due to the presence of the prisms, a different waveplate 40 is required to compensate for thermal stress birefringence in laser rod 10. If the polarization transmission matrix of totally reflecting prism 32 is $M_{TRP}$, and by analogy with equation (12), the product matrix $M_{cT}$ is defined $$M_{cT} = M_{TRP} M_w M_P M_w M_{TRP} \quad (19)$$

then, birefringence in laser rod 10 is now cancelled when $$M_{cT} = \begin{pmatrix} o & i \\ i & o \end{pmatrix} \quad (20)$$

is true. Similar substitution, as shown previously, can be carried out to find the new waveplate matrix requirements.

The matrix $M_P$ of Porro prism 14 can also be changed by applying a coating, not shown, to the reflecting surfaces of the prism. Such a coating changes the needed phase advance angle, $\rho_w$. The coating can be any antireflection coating normally used for optical windows.

This method will obviously work for any laser resonator. Numerous modifications of the above are obvious to those skilled in the art.

What is claimed is:

1. A method of correcting for thermally induced stress birefringence in a laser resonator using a pair of Porro prisms to define the ends of said laser resonator, said birefringence referring to the splitting of a beam of light into two components which travel at different velocities within said laser resonator, the faster orientation defining a fast axis angle, $\theta_w$, and the difference between the two components defining a phase advance angle, $\rho_w$, transmission of a beam of light described by a polarization transmission matrix containing 2×2 matrix elements, comprising the steps of:

evaluating a corrective polarization transmission matrix which if added to said laser resonator would eliminate birefringence in said laser resonator;
producing a waveplate with said corrective polarization transmission matrix; and
inserting said waveplate in said laser resonator.

2. A method of correcting for thermally induced stress birefringence in a laser resonator as described in claim 1 where said evaluation step comprises determining the phase advance angle, $\rho_w$, and the fast axis angle, $\theta_w$, by setting the polarization transmission matrix equal to the matrix elements needed to compensate for birefringence and calculating the required polarization transmission matrix elements of a waveplate which corrects birefringence in this laser resonator.

3. A coherent light source correcting thermally induced stress birefringence in a laser resonator comprising:

a rod made of an active gain media for emitting light along an optical path;
means for pumping said active gain media in proximity to said active gain media for causing said emitted light;
a pair of Porro prisms placed on said optical path for forming a resonating path between said Porro prisms which contains said active gain media;
a Q-switch placed in said resonating path for controlling when said emitted light resonates between said Porro prisms; and
a waveplate placed in said resonating path with a predetermined polarization transmission matrix for correcting the total polarization transmission matrix of said laser resonator which is equal to the product of the individual polarization transmission matrices of said rod with an active gain media, Porro prisms, Q-switch, and waveplate to one which is independent of emitted light coordinates.

4. A coherent light source correcting thermally induced stress birefringence in a laser resonator as described in claim 3 further comprising a coating on the reflecting surfaces of said Porro prisms to change the polarization transmission matrices of said Porro prisms.

5. A coherent light source correcting thermally induced stress birefringence in a laser resonator as described in claim 3 further comprising at least one totally reflecting prism placed between said Porro prisms such that the optical path between said Porro prisms is not linear for folding said resonating path.

6. A coherent light source correcting thermally induced stress birefringence in a laser resonator as described in either of claims 3, 4 or 5 where said active gain media comprises a Nd:YAG laser rod.

7. A coherent light source correcting thermally induced stress birefringence in a laser resonator as described in either of claims 3, 4 or 5 where said Q-switch comprises a polarizer and a Pockel cell in combination as an optical shutter.

* * * * *